No. 712,481. Patented Nov. 4, 1902.
A. BENTON.
FERTILIZER OR SEED DISTRIBUTER.
(Application filed May 16, 1902.)
(No Model.)
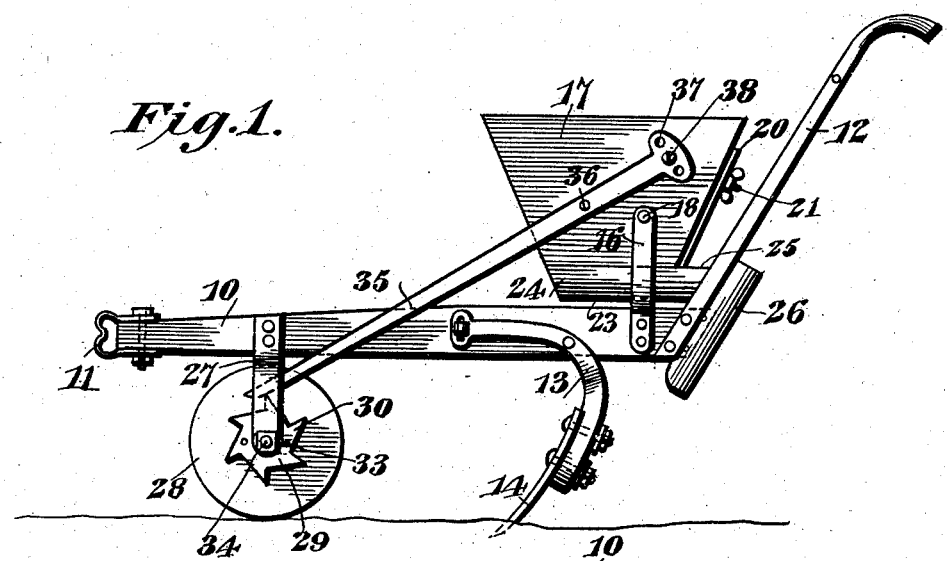
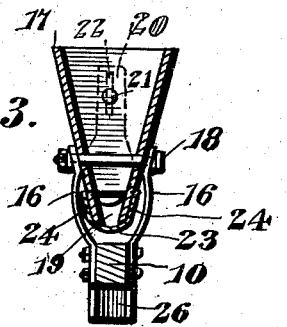
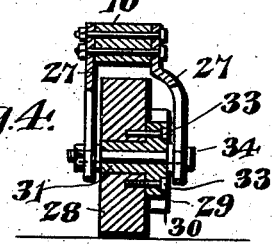
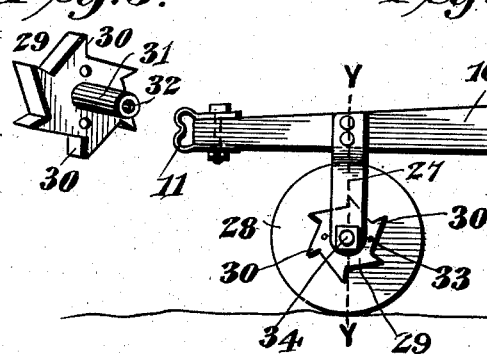
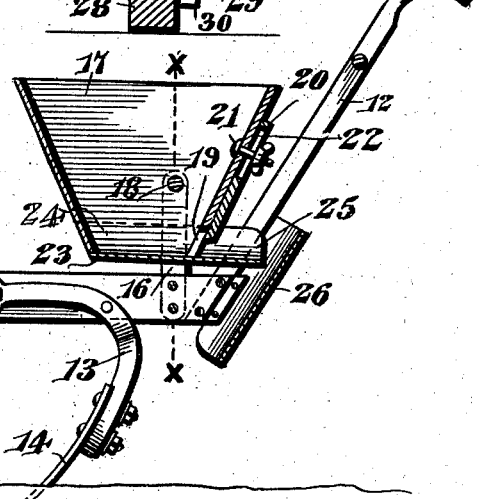
Witnesses
Jas. F. McCathran
B. G. Foster
A. Benton, Inventor
By E. G. Siggers
Attorney

UNITED STATES PATENT OFFICE.

ABBA BENTON, OF PALALTO, GEORGIA.

FERTILIZER OR SEED DISTRIBUTER.

SPECIFICATION forming part of Letters Patent No. 712,481, dated November 4, 1902.

Application filed May 16, 1902. Serial No. 107,668. (No model.)

*To all whom it may concern:*

Be it known that I, ABBA BENTON, a citizen of the United States, residing at Palalto, in the county of Jasper and State of Georgia, have invented a new and useful Fertilizer or Seed Distributer, of which the following is a specification.

The present invention relates to improvements in distributers, and while particularly intended for that class of machines employed in distributing fertilizer it will be evident that the improvements may be employed in seeders, if so desired.

One of the objects of the invention is to provide an extremely simple structure employing a vibrating or oscillating hopper or receptacle from which the material will be uniformly fed, the mechanism being adjustable so that said material may be discharged in any quantity desired.

Another object is to improve certain elements of the apparatus so as to simplify the construction, while making them strong and increasing their wearing qualities.

The preferred embodiment of the invention is illustrated in the accompanying drawings and described in the following specification, though it will be readily seen upon an inspection of the claims that the invention is not limited to the exact structure shown and described.

In said drawings, Figure 1 is a side elevation of a distributer constructed in accordance with the present invention. Fig. 2 is a longitudinal sectional view through the same. Fig. 3 is a cross-sectional view taken on the line X X of Fig. 2. Fig. 4 is also a cross-sectional view, but taken on the line Y Y of Fig. 2. Fig. 5 is a detailed perspective view of the improved disk employed.

Similar numerals of reference designate corresponding parts in all the figures of the drawings.

The improved distributer is so constructed and arranged that it may be applied to an ordinary shovel-plow, and in order to fully illustrate the application of the invention such a plow is shown in the accompanying drawings. The beam is indicated at 10, being provided at its front end with a clevis 11 and at its rear end with the usual handles 12. A plow standard or stock 13 is adjustably secured to an intermediate portion of the beam and is provided with the usual shovel 14. The new mechanism is applied directly to this plow, and to this end a pair of spaced standards 16 are secured to the opposite sides of the plow-beam 10 just in front of the handles 12, these standards projecting upwardly and having their upper portions outwardly curved, as shown in Fig. 3. A receptacle or hopper 17 is pivotally hung between the standards, being secured thereto by means of the bolt 18, said hopper having in the lower end of its rear wall a feed-opening 19. This opening is controlled by a regulating valve or slide 20, adjustably secured to the rear wall of the hopper by means of a bolt 21, that passes through a longitudinally-disposed slot 22 in the slide. The bottom 23 of the hopper is preferably constructed of a metal sheet that is concaved, as shown, to provide side flanges 24, that are fastened to the side walls of the hopper. The rear end of this bottom projects beyond the hopper and constitutes a feed-spout 25, which extends into the open upper end of a dropper-tube 26, attached to the rear end of the beam. The lower end of this tube is arranged directly in rear of the plow stock or standard. Depending from the front portion of the beam are spaced hangers 27, between which is journaled a driving-wheel 28, carrying a ratchet-disk 29. This disk, as shown, comprises a body having a plurality of suitably-formed teeth 30 on its periphery and a centrally-arranged spindle 31, provided with a central longitudinal opening 32. This spindle is passed through the driving-wheel 28, as shown in Fig. 4, and constitutes a journal or axle box for said wheel, the disk being fastened in place by means of screws 33. An axle 34 in the shape of a bolt is passed through the spindle and the hangers 27. It will therefore be observed that the drive-wheel is located directly beneath the beam and in front of the shovel.

An actuating-arm 35, secured to the hopper, rests upon the periphery of the ratchet-disk, so that when said disk rotates upon the revolution of the wheel the arm will be oscillated, consequently vibrating the hopper, and the free end of this arm is so arranged that the driving-wheel may freely revolve in either direction without being locked by it. The actuating-arm 35 is adjustably attached to the hopper, and to this end said arm is pivotally attached intermediate its ends by a fastening-bolt 36, while its upper end is provided with a plurality of openings, as 37. Through any one of these openings desired another fastening-bolt 38 is passed, thus normally holding the arm against movement upon the hopper.

The manner of using the machine will be obvious. The arm 35 and hopper 17 are first arranged in the angular relation desired, after which the material to be distributed is placed within said hopper. The feed-opening is made the necessary size by properly adjusting the slide 20. It will therefore be evident that upon the forward movement of the plow the driving-wheel will be revolved, and as the free end of the arm rides over the teeth of the ratchet-disk said arm will be oscillated, consequently vibrating the hopper and causing the material to gravitate through the feed-opening over the discharge-spout 25 and into the dropper-tube 26. The tube directs it into the furrow behind the plow and it will be covered by the loose earth dropping back into said furrow. The advantages for this structure are manifold. In the first place it is extremely simple and can be manufactured at small cost, while at the same time it is entirely efficient and uniform in its action. The driving-wheel, because of its location directly under the front end of the beam, gives the machine a direct lead and does away with any tendency of side draft. The spindle of the ratchet-disk not only strengthens the connection between said disk and the drive-wheel, but it constitutes an axle-box which preserves the wheel from wear. The hanger 27, located on the side of the machine having the ratchet-disk, constitutes a guide for the actuating-arm 35 and prevents the lateral displacement of said arm. Then, again, the construction of the bottom of the hopper is simple and inexpensive.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a distributer of the class described, the combination with a receptacle having a feed-opening, of means for pivotally supporting the receptacle upon an agricultural implement, a drive-wheel having a ratchet, hangers for supporting the drive-wheel, and an actuating-arm separate from the pivotal support and rigidly attached to the receptacle, said arm having its free end resting directly against the ratchet of the drive-wheel inside the hangers.

2. In a distributer of the class described, the combination with a receptacle having a feed-opening, of means for pivotally supporting the receptacle upon an agricultural implement, a drive-wheel having a suitable ratchet, and an actuating-arm rigidly and adjustably secured to the receptacle separately from the supporting means, said arm resting directly against the ratchet.

3. In a distributer of the class described, the combination with a receptacle having a feed-opening, of means for pivotally supporting the receptacle upon an agricultural implement, a drive-wheel having a suitable ratchet at one side, an actuating-arm rigidly secured at one end to the receptacle separately from the supporting means and having its other end resting upon the ratchet of the drive-wheel and being oscillated thereby, and means for supporting the drive-wheel directly under the beam of the plow.

4. In a distributer of the class described, the combination with a receptacle having a feed-opening, of means for pivotally supporting the receptacle upon an agricultural implement, a drive-wheel having a suitable ratchet, an actuating-arm pivoted upon the receptacle, and means adjustably connecting the receptacle and arm to hold the latter against its pivotal movement, said arm having its free end resting against and being oscillated by the ratchet of the drive-wheel.

5. In a distributer of the class described, the combination with a receptacle having a feed-opening, of means for pivotally supporting the receptacle upon an agricultural implement, a drive-wheel having a suitable ratchet, an actuating-arm pivoted at an intermediate point to the receptacle and having a plurality of openings in one end, and a fastening device passing through one of the openings, the free end of said arm resting against the ratchet of the driving-wheel.

6. In a distributer of the class described, the combination with a plow-beam, of spaced standards secured to the beam, a receptacle pivotally supported between the standards, said receptacle having a bottom provided with upturned flanges that are rigidly secured to the side walls, said bottom and flanges projecting beyond the end of the receptacle and constituting a feed-spout, and means for vibrating the entire receptacle.

7. In a distributer of the class described, the combination with a receptacle, of means for feeding the material from the receptacle, said means including a drive-wheel, and a toothed disk having a spindle that extends into the drive-wheel and constitutes a journal-bearing therefor.

8. In a distributer of the class described, the combination with a receptacle, of means for feeding the material from the receptacle, said means including a drive-wheel and a toothed disk secured to and rotatable with the drive-wheel, said disk having a hollow spindle that extends through the wheel, and a journal for said wheel passing through the spindle.

9. In a distributer of the class described, the combination with a vibrating receptacle, of a driving-wheel, a ratchet-disk secured to one side of the driving-wheel and having a spindle that passes through the wheel and constitutes a journal-bearing therefor, and an arm attached to the receptacle and resting upon the ratchet-disk.

10. In a distributer of the class described, the combination with a plow-beam, of a hopper pivotally supported above the beam, spaced hangers depending from the beam, a drive-wheel arranged between the hangers directly under the beam, a ratchet-disk secured to one face of the drive-wheel and arranged between the hangers, said disk having a hollow spindle that passes through the wheel, an axle connecting the hangers and passing through the spindle, and an actuating-arm secured to the hopper and resting upon the ratchet, said arm being arranged upon the inner side of one of the hangers.

In testimony that I claim the foregoing as my own I have hereto affixed my signature in the presence of two witnesses.

ABBA BENTON.

Witnesses:
JAS. H. CAMPBELL,
SAM. T. REID.